April 1, 1958   P. D. WURZBURGER   2,828,978
LOCKING RING STRUCTURE FOR PIPE COUPLINGS
Filed March 25, 1954   3 Sheets-Sheet 1

INVENTOR.
Paul D. Wurzburger
BY George Knowles
ATTORNEY

April 1, 1958    P. D. WURZBURGER    2,828,978
LOCKING RING STRUCTURE FOR PIPE COUPLINGS
Filed March 25, 1954    3 Sheets-Sheet 3

INVENTOR.
BY Paul D. Wurzburger
George Knowles
ATTORNEY

United States Patent Office

2,828,978
Patented Apr. 1, 1958

2,828,978

LOCKING RING STRUCTURE FOR PIPE COUPLINGS

Paul D. Wurzburger, Cleveland, Ohio

Application March 25, 1954, Serial No. 418,622

5 Claims. (Cl. 285—85)

This invention relates to coupling devices of the type comprising separable parts assembled in coaxial end to end relation, more particularly to such devices in which the coupled parts are releasably interlocked against uncoupling. The parts that are coupled may be the end fittings of tubes or pipes which may or may not contain one or more valves. The invention is also applicable to constructions in which one of the parts is a retainer such as a nut or is a closure such as a cap or plug.

Devices of the character referred to having interlocking parts are presently known, one form having a composite union nut having tubular inner and outer members telescoped one over the other and arranged for relative rotative movement. Axial shifting of one of the nut members relative to the other, as shown in copending application for patent Serial Number 418,623, filed March 25, 1954, is obtained upon relative rotation of the outer member about the inner member. Such axial shifting of one of the nut members is utilized to effect the release of an interlock arrangement between the coupling parts. The interlock arrangement may take the form of a ring of pawl teeth spring supported, splinely attached, and axially movable with respect to one coupling part, and a series of mating teeth formed on or rigidly attached to one of the nut members of the other coupling part. The pawl teeth of the one part and the mating teeth of the nut member on the opposite coupling half coact to hold the parts in operative engagement and prevent undesired retrograde movement as for example from vibration.

One of the shortcomings of such devices is the possibility that the mating or interlocking teeth do not become fully engaged during the assembling operation and retrograde movement of the coupling nut sometimes occurs as the result of vibration in use. When these couplings are assembled by individuals having little or no training or experience, the human factor may result in wide variations in the degree of tightening of the parts since the devices do not embody indicators or other means showing when the parts are properly or completely assembled or coupled. Even a supervisor or inspector is unable to check the adequacy of the completeness of the coupling connection other than by physical manipulation of the parts.

It is, therefore, one of the principal objects of the present invention to provide an improved locking ring structure which largely overcomes the difficulty mentioned and which incorporates other advantageous automatic locking and unlocking features. More particularly, the invention provides such a locking ring structure which incorporates a condition indicator that permits simple inspection by looking at, touching, or feeling the completed coupling assembly. In its preferred form the condition indicvator has relatively movable parts, preferably as components of the locking ring structure, which in both the coupled and uncoupled condition of the locking ring structure are exposed to view and to touching by the operator. Thus inspection can be effected manually in the dark or in hidden locations and visually in locations that are out of physical reach.

In the locking ring structure of the present invention the members are all made in such shape and design as to permit the use of relatively simple sheet metal stampings having good physical properties, and yet be light in weight. These features are objectives of this invention.

In the preferred arrangement the locking ring structure comprises an annular body surrounding one of the coupling parts and a plurality of bracket bodies distributed about the annular body and spaced circumferentially from one another. The annular body is disposed generally in a plane normal to the axis of the separable parts and has suitable formations such as teeth or notches for interlocking engagement with complemental formations of the coupling nut to resist relative rotary movement. Each bracket body has one axially extending element slidably interlocked with the annular body and another axially extending element formed for a spline-like interlock with the one coupling part. Resilient means is interposed between the annular body and the bracket bodies to bias the annular body against retaining stops or lugs formed at the ends of the axially extending elements of the bracket bodies.

A further object of this invention is to provide a locking ring structure for use in association with a locking component or ring, or the like on a companion coupling part, which locking ring structure is of simple design and construction, easy and inexpensive to manufacture, and which can be quickly and simply assembled with no special tools or care. The objects and advantages referred to and others are apparent in the following detailed description of the invention made in connection with the accompanying drawings forming a part of the specification and illustrating the best mode presently contemplated for caryring out the invention.

In the drawings:

Figure 1 is an elevational view, partly in section and with parts broken away and removed, of a valved coupling or union for connecting the ends of fluid conduits such as tubes used in the hydraulic systems of aircraft, the present invention being particularly concerned with the locking ring structure to prevent unscrewing of the union nut of the device, this figure showing a preferred form of such locking ring structure;

Figure 8:
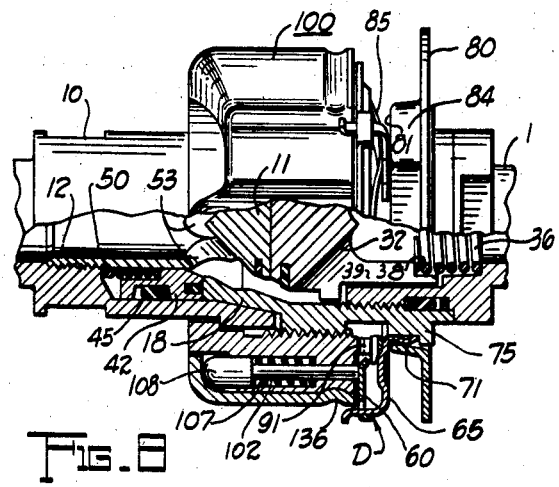
Fig. 8 is a fragmentary elevational view, partly in section and with parts broken away and removed, of an interlocking coupling assembly similar to Fig. 1, showing a modification of the invention.
Figure 9:
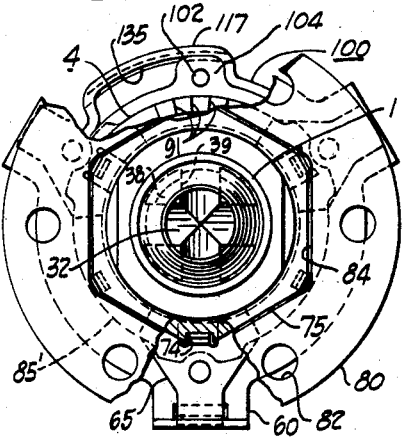
Fig. 9 is an end elevational view, partly in section and with parts broken away and removed, of the coupling assembly of Fig. 8.
Figure 12:
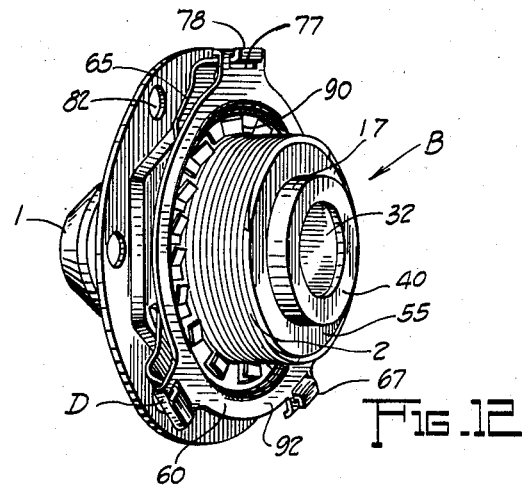
Fig. 12 is a perspective elevational view of the embodiment of Figs. 8 and 9 with the nut removed to show the relationship between the annular ring carrying the interlock formations and the retaining lugs at the ends of the bracket bodies which are held in contact with the front side of the annular ring flange surface by the action of the interposed resilient wave ring.
Figures 13, 14:
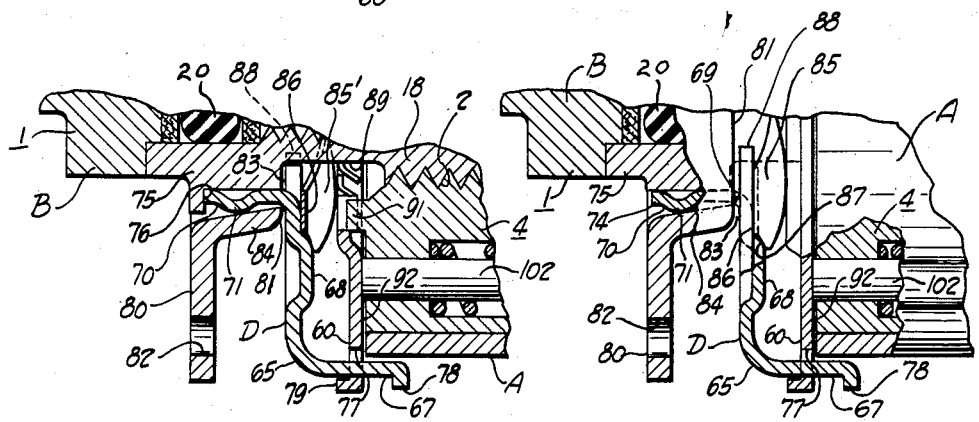

Fig. 13 is a fragmentary, partly diagrammatic sectional detail of the embodiment of Figs. 8, 9 and 12, this view being taken axially with respect to the center of the coupling, through one of the bracket bodies, to show an element of the bracket body abutted against a shoulder on the coupling body part to locate the bracket body in definite relationship to the coupling body part (with a slight gap between the hex flanged member carried by the coupling part and the radial portion of the bracket body), to show the use of an unsplit wave washer and to show the coupling nut and the body portion of the locking structure in fully assembled relationship whereby the interlock elements are adequately intermeshed and such interlock can be seen, measured, or felt.

Figure 1:
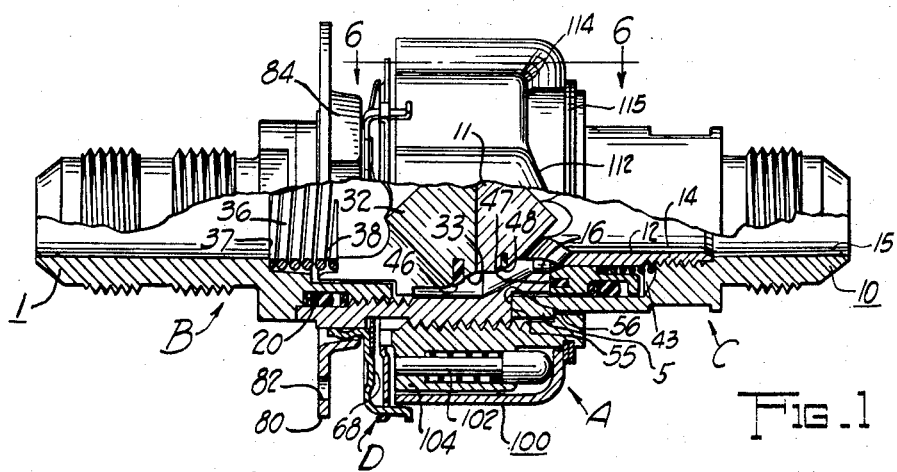
Figure 15:
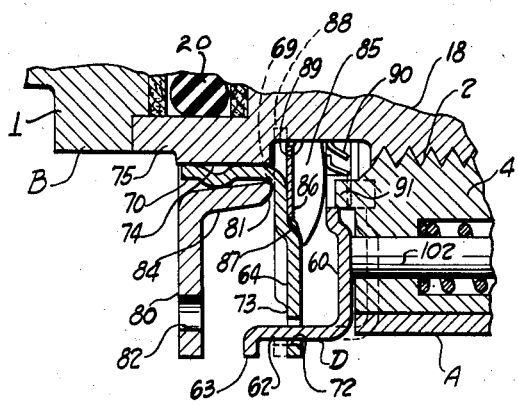
Figure 16:
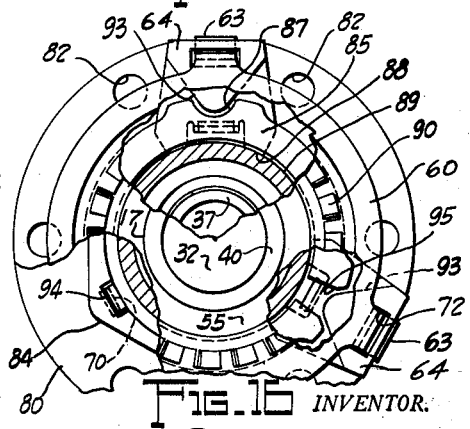

Fig. 14 is a fragmentary partly diagrammatic sectional detail similar to Fig. 13 showing in the arrangement of Fig. 1 the abutment or locating shoulder on the bracket which is arranged to bear against the flange of the hex mounting member on the coupling part and provide a slight gap between the hex member flange and the radial portion of the bracket body;

Fig. 15 is a fragmentary partly diagrammatic sectional detail similar to Fig. 14 showing another modification in which the ring portion of the annular locking body surrounding the interlock elements has integral axially extending elements or arms each projected through a notch or aperture in one of the mounting brackets, each arm having a lug to indicate the interlock engagement as by seeing, measuring, or feeling the distance between the rear face of the radial portion of the bracket body and the lug on the projected arm when the coupling body parts are brought together in fully assembled relationship; and Fig. 16 is an end elevational view of the embodiment of Fig. 15 partly in section and with parts broken away and removed to show the general shape of the bracket body members, and the means for restraining the rotation of the resilient biasing member or wave ring with respect to the bracket bodies to keep the desired relationship between the bearing surfaces of wave portions of the resilient member and the radial portions of the bracket bodies.

The present invention is illustrated in connection with a coupling assembly comprising separable parts B and C, a union nut A being carried by part C. Locking structure D of the present invention and with which the nut is associated in assembly is carried by part B. It is understood, of course, that the principles of the present invention are useful in other types of devices and have numerous applications.

Coupling assembly—general arrangement

Briefly described, the coupling parts B and C comprise tubular bodies 1 and 10, respectively, each having circular sectioned ends for conventional connection to the tubular conduits of the system in which the coupling is employed. The coupling part B is formed at its other or front end with external threads 2 which may be of the multiple or quick pitch type, these threads being engaged by corresponding internal threads 3 formed internally of internal body member 4 of the union nut A. The coupling part B may conveniently comprise the circular sectioned tubular body 1 and, received thereover in coaxial relation, a tubular extension 18 on which are formed the external coupling threads 2. The tubular extension 18 is internally threaded and screwed onto the externally threaded front end of the tubular body 1, as indicated at 19. A suitable seal, such as an O-ring 20, of rubber or the like is disposed in an annular recess between the parts to prevent escape of fluid out the coupling part through the threaded section 19.

The nut A is received embracingly about the body part 10 of the coupling part C, the latter having a radial outwardly projecting front end flange 5 in the provision of a circumferentially continuous shoulder 6 engaged in overlapping relation by an inwardly directed circular flange 7 on the rear end of the inner nut member 4 to lock or hold the parts together against axial separation. The nut A is, of course, rotatable on the body 10 of the coupling part C in screwing the nut onto the threads 2 of the coupling part B.

As the coupling parts are first brought together axially, a circular valve seat member 11 formed or carried on the end of a tubular element 12 threaded or otherwise secured in a counterbore 14 in internal axial passage 15 of the coupling body 10 is received guidingly and by an easy fit in a circular pilot opening 16 in a reduced diameter tubular end portion 17 which projects axially beyond the threads 2 of the coupling part B.

Within chamber 30 provided in the coupling part B by the tubular extension 18 and guided by the cylindrical internal walls of the latter for axial sliding movement is a valve body 32 having at its front end a frusto-conical surface 33 that sealingly engages a mating seat or surface inside the front end of the extension 18. The valve body 32 is urged or biased to the right, as viewed in Figs. 1 and 2, by a helical coil compression spring 36 which acts between a shoulder 37 formed by a counterbore in the coupling body 1 and shoulders 38 on axial extensions 39 of the valve body 32. In the drawing together of the coupling parts by the screwing of the nut A onto the threads 2 the projecting front end of the valve seat member 11 of the coupling part C is received through the pilot passage 16 and forced into endwise engagement with the valve body 32, displacing the latter to the left as to the position shown in Fig. 1, in which the sealing surface 33 of the valve body is moved away from its companion valve seat to thereby open the passage through the coupling part B. The tubular extension 39 of the valve body 32 is formed with suitable radial passages which permit substantially unimpeded flow through the internal passages in the coupling part.

While the valve 32 is thus being displaced in the assembling of the coupling parts, circular end face 40 of the reduced end 17 on the part B is received against a mating end face 41 of a sealing annulus or ring 42 slidingly received for axial movement over the tubular element 12 and within a cylindrical chamber 43 formed as by a counterbore in the tubular body 10 of the coupling part C. A suitable seal is provided between the ring 42 and the coupling body 10, such, for example, as a rubber O-ring 45. A helical coil compression spring 50 interposed between an internal shoulder of the body 10 and the sealing ring 42 biases the ring toward and into sealing engagement with a tapered or frusto-conical surface of the valve seat member 11 to close the annular opening into the axial passage through the coupling part. The tubular element 12 is formed with radial openings 53 for the flow of fluid between the central axial passage in the coupling part and the annular opening about the valve seat member 11.

The pressure of the end 17 of the coupling part B against the sealing ring 42 during the assembling together of the coupling parts forces the ring 42 away from the valve seat member 11 substantially to the displaced position shown in Fig. 1, this movement compressing the spring 50 and opening an annular passage surrounding the valve seat member 11 at the front end of the coupling body 10. The limit of the movement together of the coupling parts is determined by engagement of annular end face 55 of the coupling body 10 against an annular radial shoulder 56 on the end of the tubular extension 18 of the coupling part B. In the assembled condition the coupling parts are held together and the movable seals or valve bodies 32 and 42 are displaced from sealing engagement with their respective seats to provide a continuous through passage from one end of the coupling device to the other, as shown in Fig. 1.

Reference is made to copending application Serial Number 418,623, filed March 25, 1954, which is more particularly concerned with the general arrangement of the coupling.

Suitable deformable seals such as synthetic rubber rings 46, 47 and 48 are recessed into annular radial and axial grooves in the sealing faces 33 and 41, respectively, and in an annular radial groove in the sealing face of the seat member 11. These rubber seals project slightly from the surfaces of the members in which they are recessed and are thus compressed when the parts are brought together. These seals may be cemented or vulcanized in place, although it is adequate to hold them by press fitting.

*Notched locking structure*

During the final stage of the assembly operation an interlock is effected between the coupling nut A which forms the principal subject matter of copending application for patent Serial Number 418,623, filed March 25, 1954, and the notched locking structure D carried by the coupling part B.

Figures 2, 3:
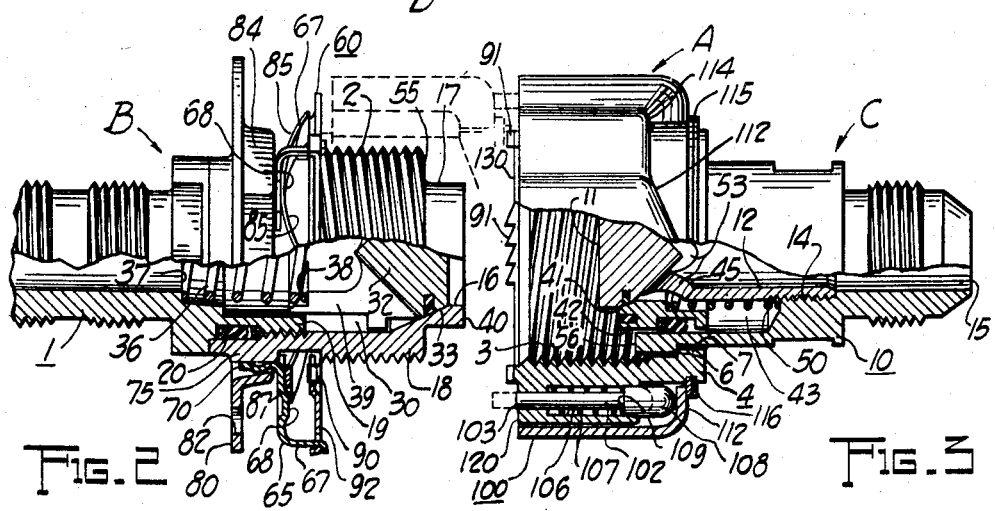
Figs. 2 and 3 are elevational views, partly in section and with parts broken away and removed, showing disassembled the left- and right-hand parts, respectively, of the coupling device of Fig. 1.

In its preferred form, as shown in Figs. 1, 2, 14 and related figures, the locking structure comprises an annular body or ring 60 which may take the form of a thin metal stamping disposed in a plane normal to the axis of the coupling part B and around the tubular extension 18 of the latter. A plurality of retaining arm and spring locating brackets 65, which also may comprise sheet metal stampings, are disposed at circumferentially spaced points about the tubular extension 18 of the coupling part B. These brackets are interlocked each by an arm 67 with the annular lock body 60 to prevent rotation of the latter relative to the coupling part. The bracket arms 67 project axially from the several brackets and are received through notches or, as shown, apertures 77 spaced circumferentially about the lock ring body 60. Each bracket arm has a free sliding fit in the corresponding aperture to permit bodily movement of one part toward and away from the other. Ends 78 of the bracket arms are bent outwardly at about 90° in the provision of an interlocking arrangement between the arms and the ring body 60, the outwardly bent ends being engageable with peripheral flanges 79 on the body 60. Thus is prevented complete separation between the ring body and each bracket to obtain the desired captive association of these parts.

Each of the brackets 65 is splinely related to the coupling part B as by integral axially projecting portions or legs 70 received in anchorage recesses which here take the form of axial slots 74 formed at the corners of a hex nut portion 75 of the tubular extension 18 of the coupling part. The leg extensions 70 of the brackets 65 are held in the slots or recesses 74 as by being snap fitted between the nut portion 75 and a surrounding mounting member 80 comprising a metal stamping having a central portion 84 embossed to provide a socket in the profile or shape of the said hex nut portion 75 to contain the latter and to thereby prevent rotation of the coupling part B relative to the mounting member. The radial flange 80 of the mounting member may be formed with circumferentially spaced apertures 82 to receive fasteners to mount the coupling part B on a panel or partition as in bulkhead construction of aircraft and the like. Each of the brackets is seen to comprise a generally Z shaped stamping having a radially disposed body portion and axially disposed arm and leg portions extending from the body portion in opposite directions.

The axially disposed leg portion 70 of each of the brackets 65 is formed with a hump or wave 71 that projects radially outwardly and requires slight deformation of the leg when inserting it into the corner slot 74 of the hex 75. The hex-shaped recess in the embossed nut portion 84 of the flanged mounting member 80 is tapered in depth so that the space available at each hex corner for one of the bracket leg portions 70 is tapered axially, the radial depth of such space progressively increasing in the direction axially away from entrance opening 94 into the slot 74 through which the bracket leg is inserted. Thus is accomplished the desired snap fit or retentive interlock arrangement by which each bracket is held assembled to the coupling part. The deformation of the bracket legs 70 required to pass the humps 71 through the relatively narrow openings into the hex slots 74 and the subsequent return of the resilient spring metal legs to their normal shape shown in the drawings holds the bracket legs captive in the axial hex slots. It is desirable, therefore, to form the brackets 65 of metal having a high modulus of elasticity, such, for example, as spring steel. It is feasible, of course, to use other metal such as aluminum and brass, in which the desired spring metal qualities can be developed by proper alloying or heat treatment. Each of the brackets is formed with stabilizing feet 88 spaced circumferentially of the coupling member 18 from one another and located on both sides of the axially projecting retaining leg 70 of the bracket. These feet bear edgewise against a reduced diameter cylindrical surface 89 of the coupling member 18 which is adjacent the larger hex nut portion 75. The engagement of the feet 88 against the coupling part at circumferentially spaced points has the effect of stabilizing the brackets against circumferential tilting or rocking and, as will appear, the feet provide convenient bearing surfaces for engagement by the resilient wave washer 85 which is interposed between the bracket and lock ring bodies.

Interposed and confined in the space between the brackets 65 and the annular body 60 of the locking structure D is a deformed or wavy washer 85 of resilient spring metal which tends to separate these parts, biasing the annular lock ring body 60 to the right as viewed in Figs. 1, 2 and 14. The outwardly bent ends 78 of the bracket arms 67 engage against the front faces of the flanges 79 on the annular ring 60 thereby limiting the axial separating movement of the brackets and the annular ring. The wave spring ring or washer is split radially at 95 (see the similar wave ring in the embodiment of Fig. 16) so that it can be expanded radially in assembling the lock structure over the threaded end 2 of the coupling part, the inner periphery of the spring washer having a diameter less than the thread crests but greater than the reduced diameter portion 89. When received about such reduced portion of the coupling part the spring washer in its contracted or normal condition is engageable with the radial shoulder at the end of the reduced or necked portion 89. This holds the locking structure captive in predetermined position on the coupling part supplementally to the retention afforded by the snap fit interlocks of the bracket legs 70 in the apertures 94 of the mounting member 80.

A circular row of inclined locking teeth 90 are formed on the annular body 60 as by stamping out tabs. These teeth project axially toward the coupling nut A so as to be engaged by axially projecting inclined teeth 91 integrally formed on the front end of the inner member 4 of the coupling nut. During the final tightening of the coupling nut A on the threads 2 of the coupling part B the nut teeth 91 ride over the teeth 90 of the locking structure in a ratchet action by reason of the inclined surfaces on the teeth. The annular body 60 yields or is displaced axially against the force of the spring 85 to permit such ratcheting and to allow the end face 55 on the body 10 of the coupling part C to be drawn up tightly against the radial locating shoulder 56 on the tubular extension 18 of the coupling part B. When the parts are fully coupled, as shown in Fig. 1, the annular body 60 of the notched locking structure is displaced to the left against the force of the spring 85 from the position which it occupies in the uncoupled condition of the parts shown in Figs. 2 and 3 of the drawings. By reason of the interlocking relationship between the teeth 90 of the locking structure and the teeth 91 of the coupling nut member 4 reverse rotation or unscrewing of the nut member 4 from the threads 2 on the coupling part B is prevented, the slope or slopes of the circumferentially inclined interlocking teeth being such as to permit ratcheting only during the coupling or assembling together of the coupling parts. The nut teeth 91 are in groups spaced circumferentially around the end face of the nut. The spacing of the groups of teeth corresponds to the circumferential spacing of the release pins 102, each group of teeth being centered on the axis of one of the release pins. By this arrangement the localized pressure applied to the toothed annular body 60 of the locking structure is closely adjacent the interlocking tooth groups. Portions of the annular toothed body 60 located intermediate the points of pressure application by the release pins 102 are thus located in confronting relation to circumferentially extending lands 130 on the end of the inner nut body 4 which are devoid of teeth and separate the groups of teeth 91.

The projection of the arms 67 through the slots or apertures 77 in the ring 60 indicates the degree of compression of the spring and hence of the condition of the interlock preventing accidental unscrewing of the nut A from the coupling part B. The minimum axial spacing of the brackets and the annular ring is limited only by the axial thickness of the spring member 85 when the latter is fully collapsed. Each outwardly bent or flanged end 78 of the bracket arms 67 constitutes an indicator showing the condition or degree of compression of the wave spring 85 and hence the completeness (or, if such be the fact, the insufficiency) of the interlock between the teeth 91 of the coupling nut and the teeth or notches 90 of the annular lock ring body 60. When the flanged end indicators 78 are spaced from the flanges 79 of the lock body—a fact which is readily determined by visual inspection or by touch—it is known that the desired rotation resisting interlock of the teeth prevails. As shown particularly well in Fig. 1, the interlocking arms 67 on the brackets 65 are located radially beyond the outermost diameter of the coupling nut A. These arms, in effect, generate a cylinder wholly outside the nut. Thus, in assembling the coupling, the ends of the arms 67 may be projected axially over the outside of the nut, this projection of the arm ends, especially when the latter are colored differently than the nut, providing a useful and convenient indication of the condition of assembly. Although the apertures 77 are shown as being formed in circumferentially spaced radial tab portions of the lock ring body 60, it is clear that the latter may be formed with a circular outer periphery defined by circumferential extensions of the flanges 79. In such arrangement the flanges 79 are continuous with one another and constitute a circular reinforcing ring flange.

The resilient spring wave member 85 has bearing points or surfaces 86 of the same circumferential spacing intervals as and engaged against the brackets 65. The spring ring and the several brackets are maintained in the desired orientation by a dimple 68 in each bracket and complementary notches 87 in the outer circumference of the wave ring to assure that the brackets 65 will receive uniform spring pressure to maintain them in predetermined shouldered positions with respect to the mounting member 80. The dimples 68 also serve as a means of reinforcement for the radial portions of the brackets 65. The apertures 77 in the lock ring body 60 are of sufficient radial depth to permit passage therethrough of the indicator flange ends 78 in assembling together the parts of the locking structure. By locating the arm receiving apertures 77 closely adjacent the peripheral flanges 79 of the lock body ring and by bending the arm ends outwardly in the provision of the indicator flanges 78, such indicator and peripheral flanges are at approximately the same radial spacing from the axis of the coupling. This physical relation facilitates perception of the condition of the interlock as by touching of the flanges with the finger tips or by visual inspection. The visual inspection is facilitated by coloring the flanges to contrast with those portions of the arms 67 that are exposed between the flanges when the coupling parts are correctly assembled.

Each bracket 65 has shoulders 69 extending circumferentially one on each side of the bracket leg portion 70 and located to give a slight gap 83 between end face 81 of the flange plate mounting member and the radial portion of the bracket 65. This gap or space avoids any radii or other interference which might tend to upset the proper alignment of the bracket arms from their normal parallel relationship to the axis of coupling half B. The spring force of the resilient wavy member 85 tends during coupling of the parts yieldingly to maintain the bracket abutments 69 individually shouldered against the mounting plate end face 81.

The circle of pawl teeth 90 on the lock body 60 are surrounded by a flat annular surface 92 substantially normal to the thrust axis of the nut assembly. This surface contains the slots or apertures 77 which receive the bracket arms 67 to hold the parts in assembled relationship. The lock ring body 60 is preferably stamped so that it comprises an inner circular portion carrying the teeth 90 and an outer circular portion in which are received the bracket arms 67. The outer portion is offset axially from the plane of the inner portion, being relatively displaced toward the confronting end of the coupling nut so that the annular surface 92 formed on such outer portion is receivable flatwise against end face 120 of the nut when the parts are fully assembled together and the teeth are interlocked.

*Multiple part nut structure*

To effect release of the interlock between the coupling nut A and the notched locking structure D, the nut embodies an outer member or sleeve 100 which is telescoped over the inner member 4 to surround and virtually completely enclose the latter, being suitably held against relative axial movement while being arranged for limited relative rotary movement. Such circumferential movement of the outer member or sleeve 100 about the inner member 4 is utilized, as by cam action, to effect simultaneous axial shifting of a plurality of release pins 102 carried by the inner member 4. The pins or release elements 102 are guided for axial sliding movement in guideways such as bores 103 drilled or otherwise provided in radial ears or lugs 104 formed integrally on the inner nut member 4. The pins 102 are equally spaced about the circumference of the coupling nut and any desired number may be employed, the even number shown being preferred since the resulting geometry of the coupling nut permits ready gripping by an externally applied wrench of conventional type. By engagement of each pin with its guideway at points axially spaced along the pin axis a distance equivalent to the major portion of the pin length the pins are able properly to direct the axial thrust forces against the locking structure and to resist without bending any circumferential forces applied by the pin actuating means.

Counterbores 106 formed in the lugs or ears 104 from the rear ends of the latter receive helical coil compression springs 107 which embrace the pins and are confined between the radial shoulders at the ends of the counterbores and shoulders 108 on enlarged heads 109 of the pins 102. Desirably the pin heads 109 have sliding fits in the counterbores 106 to guide the axial movement of the pins or release elements.

The radial ears or lugs 104 are of less axial length than the inner nut member on which they are formed so that in the retracted positions of the release elements or pins 102 the heads 109 of the latter project beyond the rearmost ends of the lugs but short of the end of the inner nut member for engagement by cam surfaces 110 carried by the outer nut member or sleeve 100. The cams comprise portions 112 of an inturned integral flange 114 on the rear end of the outer nut member 100. The inner edge portion of the end flange 114 is received within a split retaining ring 115 seated in circumferential groove 116 adjacent the rear end of the inner nut member 4.

In the stamping or other operation by which the outer nut member is made, the annular wall of such member is suitably shaped or embossed in the provision of radial projections 117 definitive of recesses 118 which receive the radial lugs or ears 104 by the inner nut member 4. Rotative movement of the outer nut member on the inner draws the cam surfaces across the spherical ends of the heads 109 of the release pins 102 and thereby shifts the pins axially in unison simultaneously to project their ends 119 through the inner end face 120 of the nut member 4 and into bearing engagement against the annular body 60 of the notched locking structure D. The limits of the relative circumferential travel of the outer member 100 about the inner nut member 4 are determined by engagement between opposite radial side faces 121 and 122 of the lugs 104 and circumferentially spaced radial surfaces 123 and 124 at the ends of the recesses 118. Portions 126 of the annular wall of the outer member 100 which lie between the radially projecting embossments 117 closely conform to cylindrically shaped surface portions 127 of the inner nut member 4 which extend between the lugs 104. By engagement of the flange 114 against the retainer 115 the outer sleeve member 100 is held on the inner nut member and prevented from relative axial movement to the right beyond the position shown in Figs. 1 and 3. The springs 107, acting through the release pin elements 102 the head of which bears against the cam surfaces 110 on the flange of the outer member, normally hold the latter against the retainer 115.

Coupling assembly operation

Figure 6:
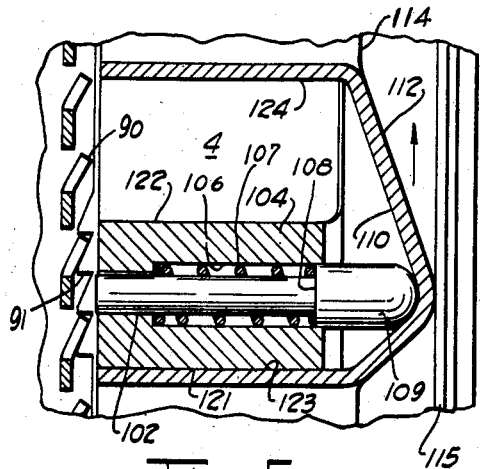
Fig. 6 is a diagrammatic fragmentary and developed sectional detail taken as though along the line 6—6 of Fig. 1 and enlarged with respect to that figure to show the relationship between the annular body of the locking ring structure, one of the axially slidable release pins and the cam for actuating such pin.

In the drawing together of the parts B and C to assemble the coupling, the nut A is turned on the coupling part B. Such turning corresponds to a counterclockwise rotation as viewed in Fig. 4, the turning torque being transmitted directly from the outer sleeve member 100 to the inner nut member 4 through the engagement of the radial surfaces 123 at the sides of the recesses 118 against the radial lug surfaces 121 simultaneously at a plurality of points distributed about the circumference of the nut. In this coupling operation the head portions 109 of the release pins 102 are received in the deepest portions of the cam surfaces 110 and the release pins are fully retracted. The turning force for tightening the coupling is applied to the outer nut member or sleeve 110 in the direction of the arrow in Fig. 6.

Coupling disassembly operation

Figures 4, 5:
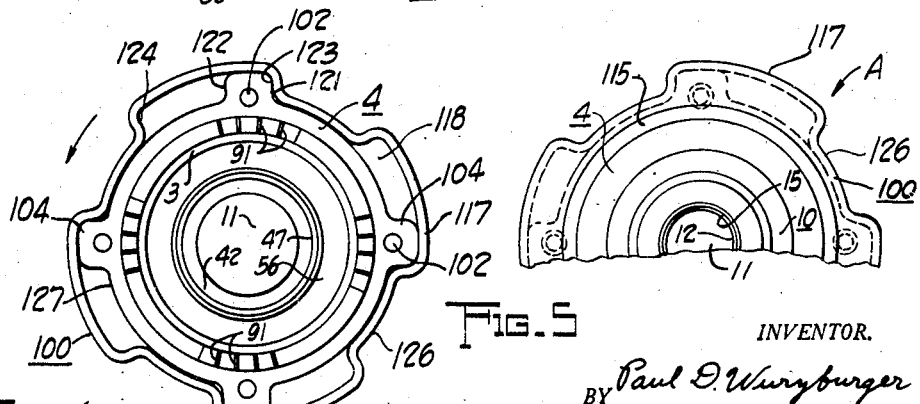
Figs. 4 and 5 are elevational views, partly in section and with parts broken away and removed, of the front and rear ends, respectively, of the coupling part shown in Fig. 3 which carries the nut structure of the present invention.
Figure 7:
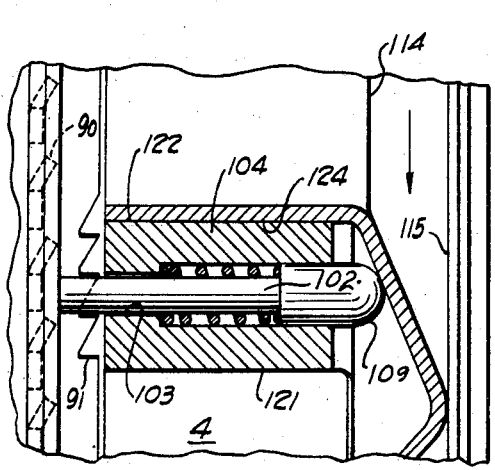
Fig. 7 is a diagrammatic sectional detail similar to Fig. 6 showing the relationship of the parts upon cam actuating movement of the outer nut member to shift the release pin axially and thereby effect separation of the locking ring teeth from the nut teeth.

In an uncoupling operation, which necessitates the release of the locking teeth 91 of the nut from the teeth 90 of the locking ring component or structure before the inner nut member 4 can be unscrewed from the threads 2, the outer nut member or sleeve 100 is turned in a direction reverse to the coupling direction, or clockwise as viewed in Fig. 4. By reason of the rotary lost motion connection between the inner and outer nut members and the resulting movement of the radial lugs 104 across the circumferentially elongated recesses 118, the cam surfaces 110 move over or ride across the heads 109 of the release element or pins 102 causing the latter to be shifted in unison axially in the guide bores 103 substantially to the positions indicated by broken lines in Fig. 3 and by full lines in Fig. 7. In this lock releasing movement and in the subsequent unscrewing of the nut from the threads 2 the nut components move in the direction indicated by the arrow in Fig. 7.

The axial projection of the release pins 102 through the end face 120 of the inner nut member 4 causes the pins to bear against the annular body 60 of the locking structure D at points spaced uniformly about the circumference of the latter. In this manner the annular body 60 is shifted away from locking position or to the left as viewed in Fig. 1 to release the interlock of the teeth 90 and 91 (see Fig. 7). Continued application of torque to the outer sleeve member 100 of the coupling nut A in the direction of the arrow of Fig. 7 causes the entire nut assembly to turn and thereby effects the unscrewing of the nut from the threads 2 of the coupling part B and the ultimate separation of the two coupling parts.

The outer rotatable hollow body part or member 100 thus, on forward turning, drives the inner member having the internal screw threads onto the mating external threads 2 of the coupling part B and, on reverse turning, thrusts the pins 102 axially beyond the pawl teeth 91 of the inner member a sufficient distance to cause the pawl teeth to be fully disengaged from the mating pawl teeth 90 of the spring loaded locking ring 60 which is carried for yielding axial movement on the other coupling part B.

Nut structure with pressure ring

Figure 10:
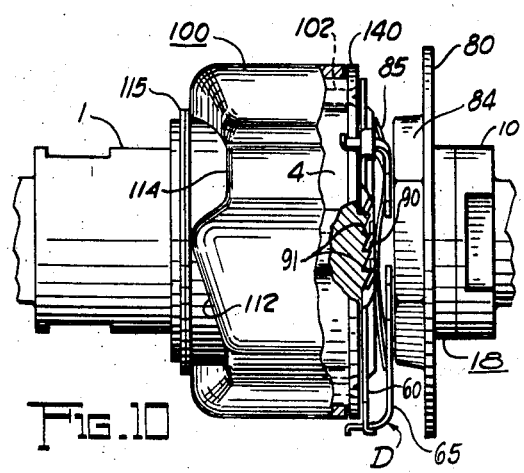
Fig. 10 is a fragmentary elevational view, partly in section and with parts broken away and removed, of another interlocking coupling assembly similar of Fig. 1, showing another modification of the invention.
Figure 11:
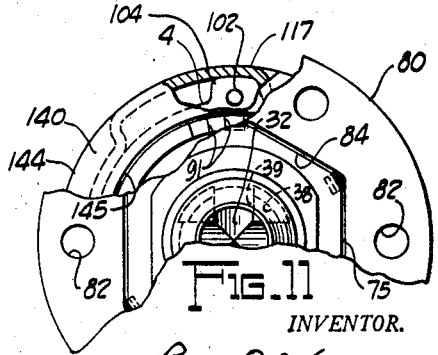
Fig. 11 is a fragmentary end elevational view, partly in section and with parts broken away and removed, of the coupling structure of Fig. 10.

In Figs. 10 and 11 is illustrated a modification of the invention in which an annular pressure ring 140 of flat metal is carried by and on the outer ends of the pins 102 for direct engagement with the annular ring body 60 of the notched locking structure D in releasing the ratchet connection. The pins 102 of the embodiment employing the pressure ring 140 are slightly longer than the pins used in the embodiments illustrated in the earlier figures and the forward or projecting ends of the pins, preferably of reduced diameter in the provision of locating shoulders, are received through drill holes or other suitable openings in the ring 140 and are riveted over or otherwise secured in the ring to retain the latter in place.

The ring 140 normally is held flatwise against front end face 120 of the inner nut member 4 by axial retraction of the pins 102 under the biasing action of the compressed springs 107. Outer peripheral edge 144 of the pressure ring is of substantially the same radius as the outer cylindrically curved surfaces of the embossments 117, while inner edge 145 of the pressure ring closely embraces and is guided by the outwardly directed sides of the locking teeth 91. By this arrangement of parts the pressure ring 140 engages the annular ring body 60 of the locking structure D simultaneously about the entire circumferential extent of the latter and closely adjacent the interlocking teeth so that pressure thus applied to the annular body through the ring 140 effects separation of the parts without straining the locking structure C. Deformation of the annular body 60 is thus avoided, permitting such toothed body to be formed as a stamping of relatively light sheet metal.

In the embodiment of the invention illustrated in Figs. 8, 9, 12 and 13 the structure is characterized by an arrangement for locating the brackets 65 axially with respect to the coupling part B which differs from that described above. In general, however, the structural components of the Figs. 8, 9, 12 and 13 modification correspond to similar parts previously described and are indicated by the same numerals of reference. The axial location of each bracket 65 is accomplished by a radial abutment means engageable with the end of the axially disposed leg portion 70 of the bracket. This abutment, indicated at 76, is constituted by an integral radial shoulder on the hex portion 75, this shoulder being located at one end of the slot 74 that receives the bracket leg portion. The geometry of the parts is such that when the end of the bracket leg 70 is abutted against the radial shoulder 76 the body of the bracket is held away or spaced from the end face 81 of the embossed hex 84 on the flange plate 80 in the provision of the slight clearance gap 83 previously mentioned. As in the case of the structural combination described in connection with the preceding figures, the leg portions of the brackets 65 in the modified embodiment are each received within one of the corresponding slots 74 and inside one of the corners of the embossed hex 84 with a snap fit. The hump or wave 71 in each leg portion 70 obtains the desired retentive interlock for holding the bracket in place.

One of the structural variations incorporated in the modification of Figures 8, 9, 12 and 13 is the utilization of wave washer 85' which is unbroken or completely annular in extent, being without the radial split 95 (Fig. 16) previously mentioned. To permit assembly of the non-split wave washer 85' over the tubular coupling part, its central opening or inner periphery is of larger diameter than the cylinder generated by the crests of the threads 2. The non-split wave washer 85' may thus readily be passed over the threaded end of the tubular extension portion 18 of the fitting part, whereas the split wave washer 85 described earlier must be distorted in assembly, since the diameter of its inner periphery is less than that of the cylinder generated by the thread crests.

A refinement of the invention of particular advantage as an aid to assembly contemplates that the several brackets 65 and the wave washer 85 (or the equivalent parts of the various modifications) be preliminarily held or interlocked together as a subassembly. The brackets may, for example, be individually attached to the spring as by spot welding to circumferentially spaced points of the latter. In such subassembly the brackets are jig located in predetermined positions about the wave washer so that placement of the washer and the brackets onto the coupling part is facilitated and can be done without special skill or training. Besides spot welding, the brackets can be attached or held captive to the wave washer by riveting or by interlocking of fingers, ears or lugs.

The wave washers 85 and 85' are subject to slight radial expansion and contraction resulting from their axial compression in the interlocking of the coupling parts. The clearances between the components are adjusted to accommodate such distortion of the wave washer, thereby avoiding objectionable interference with the fuctioning of the locking structure.

Figures 8 and 9 also illustrate a somewhat different nut structure with which the locking ring structure of the present invention can be used. In this modified nut the outer or sleeve member 100 is retained on the internal member 4 by internal circumferential ribs 135. These ribs, formed as by a rolling or pressing operation, extend across the embossments 117 of the outer member and are received in circumferential grooves 136 that extend transversely across the lugs 104 of the internal nut member.

In the embodiment of the invention illustrated in Figs. 15 and 16 certain of the structural components are the same as those previously described, or substantially so, and are indicated by the same reference numerals. In this modification, however, the interlock between the annular lock ring body 60 and the attachment brackets is effected by a plurality of axially disposed arms 62 formed integrally on the annular lock ring 60. These arms are circumferentially spaced about the lock ring and extend from the outer rim of the latter in generally parallel relation toward and through the radially disposed body portions of brackets 64, which latter correspond in general to the brackets 65 previously described. Each of the bracket bodies is formed adjacent its outer edge with a through slot or aperture 72 which receives one of the interlock elements or arms 62 in axially slidable relationship. The ends of the arms 62 projected through the apertures 72 are bent outwardly at 90° in the provision of end flange indicators 63. These flanges 63 on the ends of the interlock arms 62 locatingly engage rear faces 73 of the bracket bodies 64 when the lock ring 60 and the brackets 64 tend to be spread apart axially by the expansion of the resilient split wave spring 85, as upon disassembly of the coupling, the spring being confined under stress between the brackets 64 and the lock ring 60. In the uncoupled condition, therefore, the indicator flanges 63 are held snugly against the bracket body surface 73, the interlock described serving to hold captive the spring biased locking ring 60. An interlock between the wave spring ring 85 and each of the brackets 64 resists circumferential movement of the wave ring about the coupling part and locates such ring and the brackets in predetermined relative positions. This interlock is obtained by spot welds or fingers as previously mentioned, or by embossment of the brackets which offsets the outer portions axially toward the lock body ring 60 and provides V-shaped shoulders 93 each of which is received in one of the wave ring notches 87. The apertures 72 are of sufficient radial depth to pass the end flanges 63 on the arms 62 when the latter are pressed or sprung radially inwardly for the purpose as in original assembly of the locking structure on the coupling part.

As the nut A is screwed onto the threads 2 of the coupling part B, the lock teeth 91 of the nut ride over the inclined lock teeth 90 of the annular ring 60 and the endwise pressure of the nut against the locking ring moves the latter axially, or to the left as viewed in Fig. 15, from the normal position shown by broken lines to the displaced position shown by full lines. When the coupling parts are thus fully assembled the displacement of the indicator flanges 63 from their normal positions (against the rear faces 73 of the brackets 64) constitutes a visual indication (or an indication that can be readily sensed by lightly touching with the finger tips) of the condition of assembly. As explained above, the use of contrasting colors facilitates the interpretation of the condition as revealed by the position of the indicator flanges 63 relative to the brackets 64. In this embodiment, of course, the interlocking arms 62 are coated with a paint or color dye different from that applied to the outer edges of the indicator flanges 63 and the outer edges of the bracket bodies 73. The interlock arms 62, though located radially outwardly at a radius at least equivalent to the radius of the outermost part of the nut A, and so that the outer surfaces of the arms generate a cylindrical surface of greater diameter than that of the outermost part of the nut A, may be located within the nut diameter since the arms do not project over or toward the nut in the coupled condition.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In combination in a device such as a coupling of the type having separable parts one of which includes a nut for holding the parts together, a lock ring structure engageable with the nut to prevent inadvertent uncoupling, said lock ring structure comprising an annular body surrounding the other of the coupling parts and disposed in a plane normal to the axis of the coupling, said annular body having formations for interlocking with the nut to resist relative rotation, a retaining body mounted on said other coupling part, said retaining body being spaced from the annular body and having an element generally parallel to the axis of the coupling and extending toward and through the plane of the annular body, resilient means interposed between the bodies and biasing the annular body axially away from the retaining body for limited yielding of the annular body under nut thrust, the annular body being formed to embrace and being slidable along the axial element of the retaining body against the biasing force of the resilient means in so yielding to axial thrust of the nut, the annular body having a peripheral indicator portion located radially outwardly of and spaced further from the coupling axis than the embraced axial element of the retaining body, a radially outwardly extending indicator projection on the axis paralleling element of the retaining body, such outwardly extending indicator projection being so located on the axis paralleling element of the retaining body as to move progressively away from the plane of the indicator portion on the annular body as the latter and the resilient means yield to the thrust of the nut, and both the indicator projection on the axis paralleling element of the retaining body and the indicator portion of the annular body being disposed for simultaneous engagement by the hand of the operator surrounding the parts in coupling the parts together so that the operator determines the condition of the coupling by feel in sensing the space between the indicator portion and the indicator projection.

2. A coupling part and lock ring assembly of the type adapted for use with a companion nut carrying part axially aligned therewith, said coupling part being formed to receive and coact with the nut for drawing and holding the parts together, such coaction being effected by relative rotary movements, said lock ring comprising an annular body encircling the coupling part and disposed substantially in a plane normal to the axis of the coupling part, said annular body having formations for interlocking engagement with complemental formations of a nut received on the companion part to resist relative rotative movement of the received nut and the coupling part, a plurality of separate independent bracket bodies mounted on said coupling part and spaced angularly about its axis, said bracket bodies being axially spaced substantially uniformly from the annular body, elements extending between and connecting the annular body to each of the bracket bodies, said connecting elements each being slidably interlocked with one and rigidly held by the other of the connected bodies to permit relative movement of the bodies toward and limited movement of the bodies away from one another while resisting rotation of the annular body relative to the bracket bodies, each bracket body having a retaining element engaged with the coupling part in interfitting relation independently of the other bracket bodies and holding each such bracket body against radial movement on and relative to the coupling part, each bracket body having a circumferentially extending stabilizing portion formed with a foot bearing radially against the coupling part at a point spaced circumferentially from the retaining element of such bracket body, whereby forces inducing circumferential tilting of the bracket bodies in resisting rotation of the annular body are opposed at each bracket body by circumferentially spaced radial forces acting one on the stabilizing foot and another on the retaining element of such bracket, a resilient wavy member surrounding the coupling part and disposed between the annular body and the bracket bodies, said wavy member having one series of circumferentially spaced points bearing axially against the bracket bodies and another series of circumferentially spaced points intermediate said one series bearing axially against the annular body to bias the latter away from the bracket bodies, the wavy member and one of the bodies having mutually interfitting formations preventing relative circumferential movement whereby the wavy member is held against rotation about the coupling part and the bearing points of said one series are held in predetermined fixed relation to the several bracket bodies, respectively.

3. In combination in a device such as a coupling of the type having separable parts one of which includes a nut for holding the parts together, a lock ring structure engageable with the nut to prevent inadvertent uncoupling, said lock ring structure comprising an annular body surrounding the other of the coupling parts and disposed in a plane normal to the axis of the coupling, said annular body having inner and outer peripheral edges and formations for interlocking with the nut to resist relative rotation, said annular body being formed with an aperture relatively close to its peripheral outer edge, a retaining body mounted on said other coupling part, said retaining body being spaced from the annular body and having an axial element extending toward and through the aperture in the annular body, resilient means interposed between the bodies and biasing the annular body axially away from the retaining body for limited yielding of the annular body under nut thrust, the annular body being slidable along the axial element of the retaining body against the biasing force of the resilient means in so yielding to axial thrust of the nut, the annular body having a peripheral indicator portion located radially outwardly of the aperture and spaced further from the coupling axis than the axial element of the retaining body which extends through such aperture, a radially outwardly extending indicator projection on the axial element of the retaining body, such outward indicator projection being so located on the axial element of the retaining body as to move progressively away from the plane of the indicator portion on the annular body as the latter and the resilient means yield to the thrust of the nut, and both the indicator projection on the axial element of the retaining body and the indicator portion of the annular body being disposed for simultaneous engagement by the hand of the operator surrounding the parts in coupling the parts together so that the operator determines the condition of the coupling by feel in sensing the space between the indicator portion and the indicator projection.

4. In combination in a device such as a coupling of the type having separable parts one of which includes a nut for holding the parts together, a lock ring structure engageable with the nut to prevent inadvertent uncoupling, said lock ring structure comprising an apertured annular body surrounding the other of the coupling parts and disposed in a plane normal to the axis of the coupling, said annular body having formations for interlocking with the nut to resist relative rotation, a plurality of separate independent bracket bodies mounted on said other coupling part in a plane normal to the axis of the coupling and serving as retainers to hold the annular body in predetermined position on such other coupling part, each bracket body having a radial portion spaced axially from the annular body, said retaining bracket bodies each being spaced from the annular body and each having an axial element extending toward and projected through an aperture in the annular body, the axial elements having ends bent radially outwardly in the provision of projecting indicators spaced circumferentially about and receivable against the annular body, resilient means biasing the annular body axially away from the retaining bracket bodies, the annular body being slidable along the axial elements of the retaining bracket bodies against the biasing force of the resilient means in yielding to axial thrust of the nut, the annular body having peripheral indicator portions against which are received the radially outwardly projecting indicators on the axial elements of the bracket bodies, said indicator portions being located radially outwardly of and spaced further from the coupling axis than the axial elements of the bracket bodies, such indicator projections being so located on the axial elements of the retaining bracket bodies as to move progressively away from the plane of the indicator portions on the annular body as the latter and the resilient means yield to the thrust of the nut, the outermost edges of the indicator portions of the annular body and the outermost edges of the indicator projections on the bracket elements being equidistant from the coupling axis so that outwardly opening gaps prevail between the indicator portions and projections when the annular member yields under nut thrust and are eliminated when the annular member is released by the coupling nut, the outwardly projecting indicators being received flatwise against the indicator portions of the released annular body with their equidistant edges juxtaposed, and both the indicator projections of the axial elements of the bracket bodies and the indicator portions of the annular body being disposed for simultaneous engagement by the hand of the operator surrounding the parts in assembling the coupling whereby the operator determines the condition of the coupling by feel in sensing the gaps between the indicator portions and the indicator projections.

5. In combination in a device such as a coupling of the type having separable parts one of which includes a nut for holding the parts together, a lock ring structure engageable with the nut to prevent inadvertent uncoupling, said lock ring structure comprising an annular body surrounding the other of the coupling parts and disposed in a plane normal to the axis of the coupling, said annular body having formations for interlocking with the nut to resist relative rotation, a retaining body mounted on said other coupling part, said retaining body being spaced from the annular body and having an element generally parallel to the axis of the coupling and extending toward and through the plane of the annular body, said axis paralleling element being located at a distance from the coupling axis greater than the radius of the circular surface generated by the outermost portions of the nut, resilient means interposed between the bodies and biasing the annular body axially away from the retaining body for limited yielding of the annular body under nut thrust, the annular body being formed to embrace and slide along the axial element of the retaining body against the biasing force of the resilient means in so yielding to axial thrust of the nut, the annular body having a peripheral indicator portion located radially outwardly of and spaced further from the coupling axis than the embraced axial element of the retaining body, a radially outwardly extending indicator projection on the axis paralleling element of the retaining body, such indicator projection being so located on the axis paralleling element of the retaining body as to move progressively away from the plane of the indicator portion on the annular body as the latter and the resilient means yield to the thrust of the nut, the indicator projection on the axis paralleling element moving to a position radially outward of and in overlying relation to an engaged and interlocked nut during said yielding of the annular body, and both the indicator projection on the axis paralleling element of the retaining body and the indicator portion of the annular body being disposed for simultaneous engagement by the hand of the operator surrounding the parts in coupling the parts together so that the operator determines the condition of the coupling by feel in sensing the space between the indicator portion and the indicator projection.

References Cited in the file of this patent
UNITED STATES PATENTS

| | | |
|---|---|---|
| 2,311,239 | Main et al. | Feb. 16, 1943 |
| 2,498,104 | Brandau et al. | Feb. 21, 1950 |
| 2,665,927 | Becker | Jan. 12, 1954 |

FOREIGN PATENTS

| | | |
|---|---|---|
| 1,035,698 | France | Apr. 22, 1953 |